United States Patent [19]

Baker et al.

[11] 4,151,930

[45] May 1, 1979

[54] AUTOMATIC PATTY FEEDER

[75] Inventors: Edward D. Baker, San Francisco; Nils Lang-Ree, Los Altos, both of Calif.

[73] Assignee: NPI Corporation, Burlingame, Calif.

[21] Appl. No.: 903,723

[22] Filed: May 8, 1978

[51] Int. Cl.$^2$ .............................................. B65H 3/24
[52] U.S. Cl. ................................................... 221/129
[58] Field of Search ............... 221/270, 274, 125, 129, 221/272, 273, 240, 262, 125; 214/8.5 F

[56] References Cited

U.S. PATENT DOCUMENTS

| 2,594,147 | 4/1952 | Fry | 221/125 X |
| 3,160,315 | 12/1964 | Stone et al. | 221/129 X |
| 3,896,826 | 7/1975 | Petersen | 133/4 R |

*Primary Examiner*—Stanley H. Tollberg
*Attorney, Agent, or Firm*—Lothrop & West

[57] ABSTRACT

An automatic patty feeder advances a frozen meat patty across a support table having a longitudinal slot therein from a position at the bottom of a stack of patties all but the lowest one of which is longitudinally confined. Below the table is an upper, short, horizontal track overlying a lower, long, horizontal rail. A carrier reciprocates longitudinally and moves a pusher link having a bearing adapted to ride on the track and on the rail and having a pusher adapted to move through the slot and to abut the lowest patty. The bearing can fall from one end of the track onto the rail and can be lifted from the other end of the rail up to the level of the track by a solenoid.

7 Claims, 3 Drawing Figures

AUTOMATIC PATTY FEEDER

BRIEF SUMMARY OF THE INVENTION

For use on a machine for cooking frozen hamburger patties and the like, there is added a generally flat, horizontal support table with a longitudinal slot therein. A stack of frozen patties is arranged to rest on the table straddling the slot. The stack of patties, except for the lowermost one, is confined against longitudinal or horizontal advancement. Reciprocating beneath the table is a carrier having a movable pusher link thereon. The carrier reciprocates to and fro in the longitudinal direction, and the link has a bearing which rests on an upper track just below the table and can fall at one end of the track down onto a longer rail. At the other end of the rail a solenoid, when energized, is effective to lift the bearing up to the level of the track. Also on the pusher link is a pusher bar that can reciprocate either above or below the table level, depending upon whether the bearing is on the rail or the track. In its uppermost position, the pusher bar abuts the lowermost patty and forces it to advance, following which the pushing bar is lowered as the bearing falls to the lower rail and returns for lifting by the solenoid, if desired.

DETAILED DESCRIPTION

Figure 1:
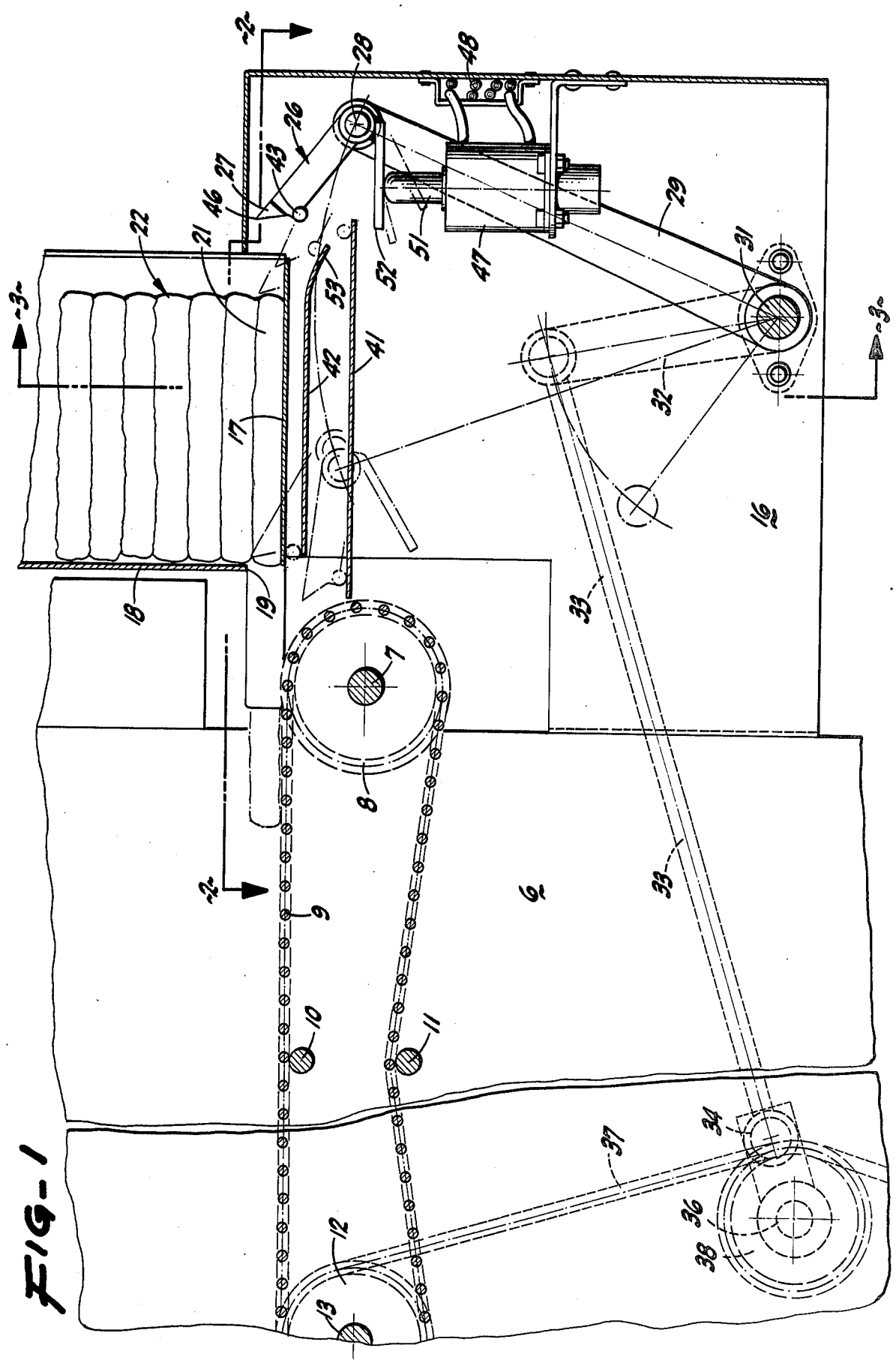
FIG. 1 is a cross-section on a longitudinal, vertical plane through an automatic patty feeder constructed pursuant to the invention, the plane of section being indicated by the line 1—1 of FIG. 2.
Figure 2:
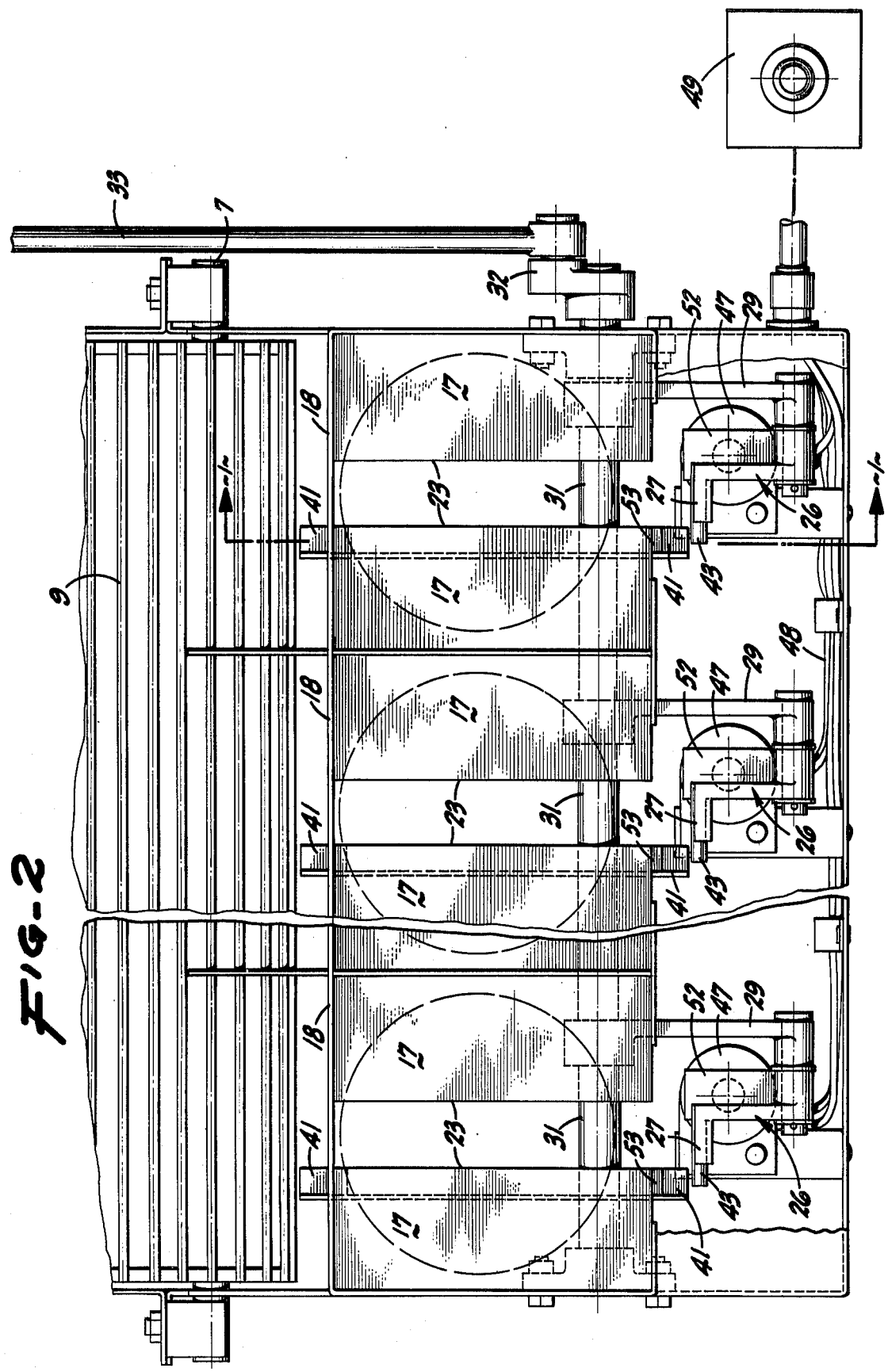
FIG. 2 is a plan view, portions being broken away, of the automatic patty feeder constructed pursuant to the invention, some portions being shown in cross-section, the planes of which are indicated by the lines 2—2 of FIG. 1.
Figure 3:
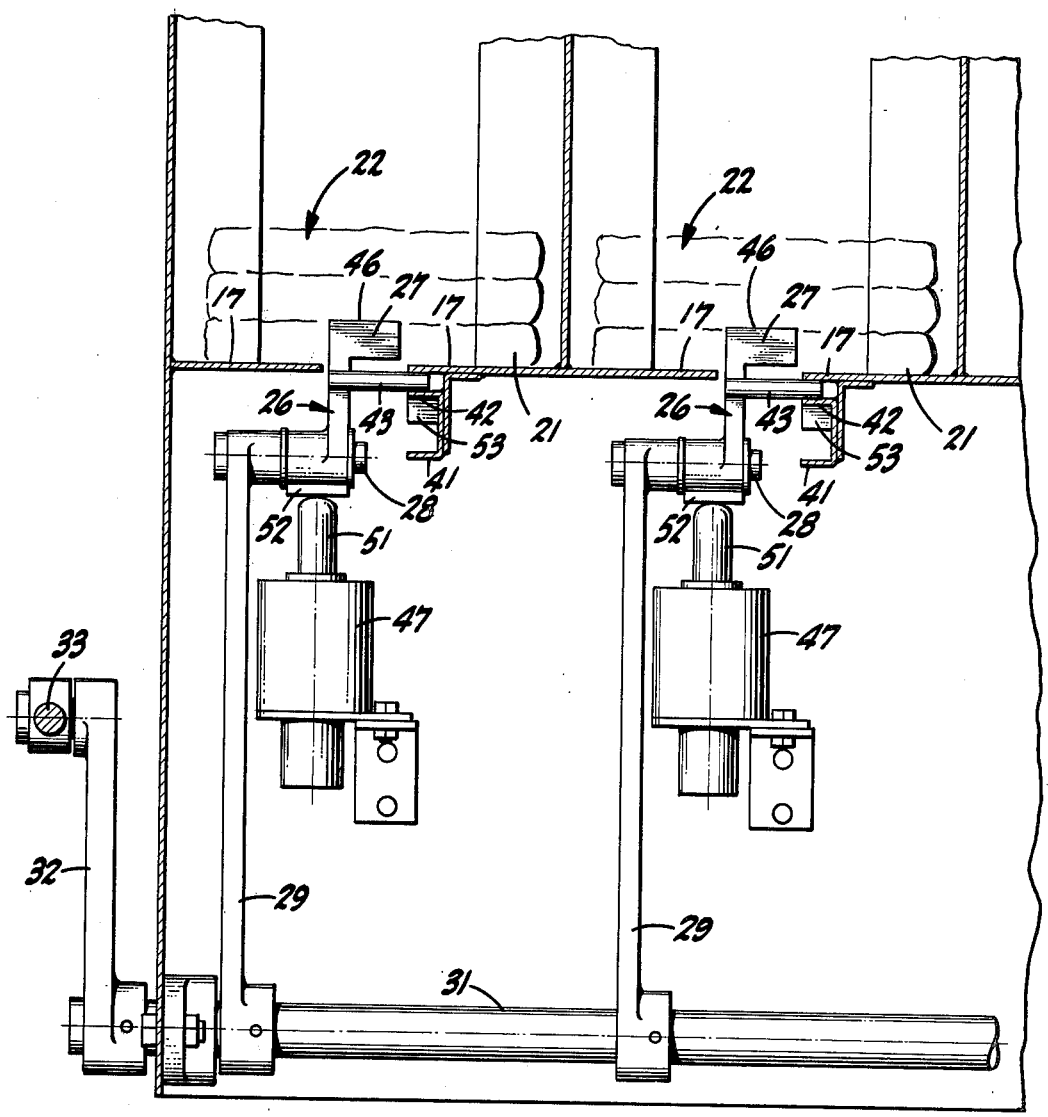
FIG. 3 is a cross-section, the plane of which is indicated by the line 3—3 of FIG. 1, portions being broken away.

The automatic patty feeder of the invention is designed to be applied to or incorporated in a machine for handling patties such as a patty broiler of a well-known kind. The broiler unit has a main frame 6 on which is supported a sprocket shaft 7 carrying sprockets 8 around which is trained a bar chain 9 supported by rods 10 and 11 and also extending around sprockets 12 mounted on a shaft 13. The shaft 13 is preferably driven by means (not shown) in any convenient fashion.

Pursuant to the invention, there is attached to the frame 6 a frame 16 of the automatic patty feeder in such a fashion as to dispose a support table 17 substantially at the level of the upper run of the chain or conveyor 9. Included in the frame 16 is a forward wall 18 of solid construction except that it is provided with a slot 19 at the lower end. The slot 19 has substantially the height of a lowermost patty 21 in a stack 22 of patties resting on the table 17. There is a central, longitudinal slot 23 in the table 17 in and through which a pusher link 26 is appropriately reciprocable at one of two selected levels.

The pusher link 26 at its forward end carries a pusher bar 27 and at its rearward end is connected by a pivot 28 to a carrier arm 29 mounted on a pivot shaft 31 on the frame 16. Since several feeders may be arranged in parallel, there may be several carrier arms on the shaft 31 to work in unison. The shaft 31 also carries a lever 32 joined by a connecting rod 33 to an eccentric pin 34 movable about the axis of a shaft 36 on the frame 6. A drive chain 37 extends from the sprocket 12 around a sprocket 38 on the shaft 36. As the conveyor 9 is advanced, the pin 34 is rotated in an orbital path and through the rod 33 reciprocates the arm 32 and correspondingly oscillates the carrier 29 and the pusher link 26.

To control the elevation of the pusher link, there is provided a lower, relatively long, horizontal rail 41 suitably supported on the frame 16 and disposed at one side of the central, longitudinal slot 23. The rail 41 lies just below a relatively short, superposed track 42 also supported on the frame 16 to one side of the slot 23. The track is curtailed at both its opposite ends to a short length leaving portions of the long rail 41 extending beyond the track at both ends. The pusher link 26 carries a laterally extending bearing rod 43 adapted to slide on the track and on the rail.

In the operation of this device from the position shown in FIG. 1 and when the parts are all in place for feeding, the oscillation or reciprocation of the carrier 29 moves the pusher link 26 toward the left in FIG. 1 with the bearing rod 43 resting upon the track 42 and so advancing in a predetermined direction in a level path. The pusher link 26 then extends above or projects somewhat through the slot 23 in the support table 17, and as the pusher bar 27 advances, it first encounters the trailing edge of the lowermost, frozen patty 21. Since the lowermost patty and the next higher patty may have become frozen together, the pusher bar 27 is provided with a sharp engaging point 46 that tends to enter between the two lowermost patties and physically to pry or cam them apart and separate them.

As the pusher bar advances, it urges the lowermost patty forwardly. Since the opening 19 is available, the patty advances therethrough and onto the bar chain conveyor 9. Even though there may be some tendency to carry along the next lowermost patty, the next lowermost patty cannot advance because of the barrier provided by the wall 18. When the lowermost patty is advanced far enough, the next lowermost patty falls and itself becomes the lowermost patty.

At about this time in the operation of the device, the bearing rod 43 comes to and past the end of the track 42 and falls by gravity. This is easily possible since the pusher link 26 is freely turnable on the pivot 28. As the pusher link falls, the bearing rod 43 drops onto and rests on the lower rail 41. The pusher bar 27 is then well disengaged from the patty, at that time resting on or substantially resting on the conveyor 9 and advancing thereon for cooking.

The carrier 29, having reached its foremost position, then retreats toward the starting point. The bearing rod 43 rests on the rail 41 and gets close to the beginning end of the rail and out from beneath the upper track 42. If nothing else occurs, subsequent oscillations of the carrier 29 simply move the pusher link to and fro with the bearing rod sliding on the lower rail with the pusher bar 27 in a low position below the slot 19 and without any patty feeding capability.

When it is desired to feed an additional patty, a special mechanism is actuated for the purpose. Disposed on the frame 16 just below the pusher link 26 in its retracted position is a solenoid 47 connected in a controlled electrical circuit 48 extending from a control box 49. When the solenoid is not energized, its core 51 is in a lower, dotted line position as seen in FIG. 1. When the solenoid is energized, its core 51 is projected to an upper, solid line position and lies in the path of a cam bar 52 on and depending from the pusher link 26.

The cam bar normally lies in an inclined, lowermost position and overruns and misses the retracted solenoid core. When the solenoid core is projected, then the cam bar 52 rides against and on the projected core. This lifts or rotates the pusher link 26 in a clockwise direction. This also lifts the bearing rod 43 from the rail 41 upwardly past the end of the track 42 and substantially to or above the level of the track 42.

As the solenoid remains energized and the carrier 29 begins its return motion, the bearing rod 43 then lowers slightly and contacts the track 42 as the cam bar 52 advances away from the core 51. Depending upon the particular layout utilized, the leading end of the track 42 may have a downturned portion 53 to assist the reception of the advancing bearing rod. As the carrier 29 moves toward the left in FIG. 1, the bearing rod 43 again rides on the track 42 and the pusher bar 27 again abuts and forces ahead the then-lowermost patty in the track and resting on the support table 17 astride the slot 19. The patty feed continues as long as the solenoid is energized and just as previously described until the entire stack 22 is exhausted.

By controlling the individual solenoids 47 in the individual feeding devices by appropriate controls, a number of patties can be fed simultaneously, or only some patties can be fed at one time, or the individual strokes of the carrier can be effective or ineffective to feed. In this way, the supply of patties to the rest of the mechanism can be selectively controlled.

We claim:

1. An automatic patty feeder comprising a frame, a support table on said frame and having a longitudinal slot therein extending in a predetermined direction, a carrier, means for mounting said carrier on said frame for reciprocatory motion in said predetermined direction between a forward position and a rearward position, a pusher link, means for pivoting one end of said pusher link on said carrier for pivotal movement of said pusher link from a position below said slot to a position extending through said slot, a bearing rod extending laterally from the free other end of said pusher link, a relatively short track on said frame parallel to and below said slot, a relatively long rail on said frame parallel to and below said track and extending beyond both ends of said track, a cam bar extending from said pusher link, a solenoid coil on said frame adjacent said rearward position, a solenoid core in said coil and movable between a lower position and an upper position, said core being adapted to abut said cam bar when said carrier is in said rearward position and being adapted to move said pusher link on said bearing rod from a lower position with said bearing rod level with said rail to an upper position with said bearing rod level with said track.

2. A device as in claim 1 in which said rail is relatively long with respect to said track, and means for mounting said rail on said frame below said track and in a position to support said bearing rod beneath and beyond the ends of said rail.

3. A device as in claim 2 including electrical means on said frame for lifting said bearing rod from said rail to the level of said track.

4. A device as in claim 3 in which said lifting means is a solenoid having a projectable core.

5. A device as in claim 1 in which said pusher link is adapted to move through said slot between said upper position and said lower position and through the length of said slot.

6. A device as in claim 5 in which said pusher bar has a wedge-like configuration.

7. A device as in claim 1 including a patty conveyor belt on said frame, means on said frame for advancing said patty conveyor belt on said frame, and means operated by said advancing means for reciprocating said carrier.